(12) United States Patent
Yasuda et al.

(10) Patent No.: US 7,812,598 B2
(45) Date of Patent: Oct. 12, 2010

(54) ELECTRICAL DEVICE AND MANUFACTURE METHOD FOR THE SAME

(75) Inventors: Atsushi Yasuda, Anjo (JP); Isao Miyagawa, Kariya (JP)

(73) Assignee: Denso Corporation, Kariya (JP)

( * ) Notice: Subject to any disclaimer, the term of this patent is extended or adjusted under 35 U.S.C. 154(b) by 741 days.

(21) Appl. No.: 11/802,136

(22) Filed: May 21, 2007

(65) Prior Publication Data

US 2007/0290681 A1    Dec. 20, 2007

(30) Foreign Application Priority Data

May 24, 2006    (JP) ............................ 2006-144571

(51) Int. Cl.
*G01B 7/30*    (2006.01)
(52) U.S. Cl. .................................. 324/207.25; 73/317
(58) Field of Classification Search ............ 324/207.25; 73/290 R, 309, 317, 514.31, 514.39
See application file for complete search history.

(56) References Cited

U.S. PATENT DOCUMENTS

2005/0083045 A1    4/2005    Miyagawa

FOREIGN PATENT DOCUMENTS

JP    05-036671    9/1993
JP    2003-151691    5/2003

OTHER PUBLICATIONS

Japanese Office Action dated Jan. 26, 2010, issued in corresponding Japanese Application No. 2006-144571, with English translation.
Japanese Office Action dated Jul. 20, 2010, issued in corresponding Japanese Application No. 2006-144571, with English translation.

*Primary Examiner*—Bot L LeDynh
(74) *Attorney, Agent, or Firm*—Nixon & Vanderhye PC

(57) ABSTRACT

An electrical device includes a terminal connected with an electronic component, a pliant member which contacts a part of the terminal in a longitudinal direction of the terminal and covers a whole circumference of the part, and a casing for holding the electronic component and the terminal and the pliant member. The casing is molded by a resin material with the electronic component, the terminal and the pliant member being insert-molded. The end portion of the terminal of an opposite side to the electronic component extends to an outer side of the casing. One part of the pliant member is covered by the casing and the other part thereof is exposed to the outer side of the casing. The pliant member is compressed in a direction substantially orthogonal to the longitudinal direction of the terminal.

15 Claims, 4 Drawing Sheets

ELECTRICAL DEVICE AND MANUFACTURE METHOD FOR THE SAME

CROSS REFERENCE TO RELATED APPLICATION

This application is based on a Japanese Patent Application No. 2006-144571 filed on May 24, 2006, the disclosure of which is incorporated herein by reference.

FIELD OF THE INVENTION

The present invention relates to an electrical device and a manufacture method thereof.

BACKGROUND OF THE INVENTION

Generally, an electrical device can be suitably used for a liquid surface detecting device. For example, with reference to JP-2005-10047 A, the electrical device can be suitably used as a fixing member of the liquid surface detecting device. In this case, an up-down direction movement of a float which floats at a liquid surface is transmitted through an arm to a rotation member in which a magnet is fixed, so that the rotation member rotates. A Hall element, being a magneto-electric conversion element, is arranged in the fixing member which rotatably holds the rotation member.

The fixing member (electrical device) of the liquid surface detecting device is molded by a resin material, with the Hall element (magnetoelectric conversion element) and terminals which are electrically connected with the Hall element being arranged at predetermined positions in the resin material to be insert-molded.

In this case, the end of the terminal is exposed to the outer side of the resin material to be connectable with an exterior electrical circuit, so that the Hall element can be electrically connected with the exterior circuit. A rubber material is arranged at a halfway (of longitudinal direction thereof) of the terminal, in such a manner that the rubber material covers the whole circumference of the terminal. The rubber material is also inert-molded in the resin material along with the above-described molding.

In this case, the fixing device of the liquid surface detecting device is arranged in a fuel tank and disposed at a position which is lower than the liquid surface position of a fuel in the fuel tank when the tank is filled up. Thus, the fixing member is completely dipped in the fuel in the case where the state of the fuel tank is between a full-tank state and a predetermined state (where liquid surface is at a predetermined position). Moreover, even when the liquid surface becomes lower than the fixing member, the fixing member will be dipped in the fuel and/or fuel spray will adhere to the fixing member because the liquid surface moves due to the vibration of the vehicle.

The terminal is made of a metal. However, because there is difference between a thermal coefficient of expansion of the metal and that of the resin material, a gap will occur between the terminal and the resin material in the use of the liquid surface detecting device. Thus, the fuel may intrude upon the gap to reach the Hall element. Therefore, the Hall element will be corroded and the normal operation thereof will be hampered.

In this case, the fixing member is provided with the rubber member which is positioned at the halfway (of longitudinal direction) of the terminal and covers the whole circumference of the terminal in the resin material. The rubber material is compressed to be deformed due to an injection pressure of the resin material in the insert-molding by the resin material. Thus, the bearing stress of a contact portion between the rubber material and the resin material increases due to the elastic force so that the sealing performance therebetween is improved, to restrict the fuel (having entered resin material) from reaching the Hall element.

However, according to the fixing device (electrical device) of the liquid surface detecting device, the force which elastically deforms the rubber material depends on the molding pressure of the resin material. Because there is a large variation in the molding pressure, it is difficult to stably maintain the sealing performance.

SUMMARY OF THE INVENTION

In view of the above-described disadvantage, it is an object of the present invention to provide an electrical device in which a liquid having intruded upon a resin material through a gap between a terminal and the resin material is substantially restricted from reaching an electronic component, and a manufacture method for the same.

According to a first aspect of the present invention, the electrical device has an electronic component, a terminal which is electrically conductive and connected with the electronic component, a pliant resin member which contacts a part of a longitudinal direction of the terminal and covers a whole circumference of the part of the terminal, a casing for holding the electronic component, the terminal and the pliant resin member. The casing is molded by a resin material with the electronic component, the terminal and the pliant resin member being insert-molded. An end portion of the terminal is positioned at an outer side of the casing. The end portion is at an opposite side of the terminal to the electronic component. One part of the pliant member is covered by the casing and an other part of the pliant member is exposed to the outer side of the casing. The pliant resin member is compressed in a direction which is substantially orthogonal to the longitudinal direction of the terminal, in the vicinity of an end surface of the casing.

In this case, the pliant resin member is partially exposed to the outer side of the casing, so that the pliant resin member can be pressed by the molding die in swaging of the molding die to be compressed.

In a conventional electrical device, a rubber member is compressed by a resin pressure in a resin molding. According to the present invention, when the casing is resin-molded, the resin molding is performed in a compressed state by the molding die, so that the compression rate of the pliant resin member can be maintained. The bearing stress between the pliant resin member and the casing in the vicinity of the part of the pliant resin member which contacts the molding die can be maintained to have a disable value (that is, value by which a satisfactory sealing performance can be provided).

Thus, a liquid having intruded upon the inner side of the resin member (pliant resin member) through a gap between the terminal and the resin member can be substantially restricted from reaching the electronic component.

Preferably, the pliant resin member is made of a rubber. Sorts of the rubber are abundant, so that the rubber having the suitable hardness (which is related to elasticity thereof) and corrosion-resistant performance can be selected according to the liquid where the electrical device is dipped. Thus, the electrical device where the liquid having reached the inner side of the resin member through the gap between the terminal and the resin member can be substantially restricted from reaching the electronic component can be provided.

According to a second aspect of the present invention, the electrical device has an electronic component, a terminal which is electrically conductive and connected with the electronic component, a sheath member which is molded by a first resin material and fixed to a part of the terminal due to molding to house the electronic component, a pliant resin member which contacts a part of a longitudinal direction of the terminal and covers a whole circumference of the part of the terminal, and a casing for holding the sheath member in which the electronic component is housed, the terminal and the pliant resin member. The casing is molded by a second resin material with the terminal, the pliant resin member and the sheath member housing therein the electronic component being insert-molded. An end portion of the terminal is positioned at an outer side of the casing, the end portion being at an opposite side of the terminal to the electronic component. One part of the pliant resin member is covered by the casing and an other part of the pliant resin member is exposed to the outer side of the casing. The pliant resin member is compressed in a direction which is substantially orthogonal to the longitudinal direction of the terminal, in the vicinity of an end surface of the casing.

In this case, the pliant resin member is partially exposed to the outer side of the casing, so that the pliant resin member can be pressed by the molding die in swaging of the molding die to be compressed. According to the present invention, when the casing is resin-molded, the resin molding is performed in a compressed state by the molding die, so that the compression rate of the pliant resin member can be maintained. The bearing stress between the pliant resin member and the casing in the vicinity of the part of the pliant resin member which contacts the molding die can be maintained to have a disable value (that is, value by which a satisfactory sealing performance can be provided).

Thus, the liquid having intruded upon the resin member through the gap between the terminal and the resin member can be substantially restricted from reaching the electronic component.

However, there exists an electronic component having a heat-resistant temperature which is lower than a melt temperature of the resin material for molding the casing. Thus, the electronic component will be deteriorated when the melted resin material directly contacts the electronic component in molding of the casing.

According to the second aspect of the present invention, in molding of the casing, because the electronic component is beforehand housed in the sheath member, the melted resin material does not directly contact the electronic component. Therefore, the temperature of the electronic component in molding of the casing is lower than the heat-resistant temperature thereof, so that the deterioration of the electronic component can be restricted.

If the sheath member is not provided, the posture of the electronic component will vary due to an injection pressure of the melted resin material so that the property of the electrical device will vary. According to this invention, because the electronic component is beforehand housed in the sheath member, the posture and the position of the electronic component in the casing can be maintained.

According to a third aspect of the present invention, a manufacture method for the electrical device of the first aspect of the present invention includes an adhering process for fixedly contacting the pliant resin member with the terminal by molding, a connecting process for electrically connecting the electronic component with the terminal to construct a subassembly, and a molding process for molding the casing after the connecting process. The connecting process is performed after the adhering process. The molding process includes a holding process, a filling process, a solidifying process, and a mold-releasing process. The holding process is performed to hold the subassembly in a cavity of a molding die of the casing while the pliant resin member is pressed and compressed by the molding die. The filling process is performed to fill the resin material of the casing into the cavity after the holding process. The solidifying process is performed to solidify the resin material in the cavity. The mold-releasing process is performed to take the casing have been molded out of the molding die after the solidifying process.

Thus, the compression rate of the pliant resin member can be maintained. Therefore, the bearing stress between the pliant resin member and the casing in the vicinity of the part of the pliant resin member which contacts the molding die can be maintained to have a disable value (that is, value by which a satisfactory sealing performance can be provided). Accordingly, the electrical device where the liquid can be substantially restricted from intruding upon the vicinity of the electronic component can be readily manufactured by the manufacture method.

According to a fourth aspect of the present invention, a manufacture method for the electrical device of the second aspect of the present invention includes an adhering process for fixedly contacting the pliant resin member with the terminal by molding, a first molding process for molding the sheath member by the first resin material and simultaneously fixing the sheath member to the part of the terminal, a connecting process for accommodating the electronic component in the sheath member and electrically connecting the electronic component with the terminal to construct a subassembly, and a second molding process for molding the casing after the connecting process. The connecting process is performed after the first molding process. The second molding process includes a holding process, a filling process, a solidifying process, and a mold-releasing process. The holding process is performed to hold the subassembly in a cavity of a molding die of the casing while the pliant resin member is pressed and compressed by the molding die. The filling process is performed to fill the second resin material into the cavity after the holding process. The solidifying process is performed to solidify the second resin material in the cavity. The mold-releasing process is performed to take the casing have been molded out of the molding die after the solidifying process.

Thus, the electrical device where the liquid can be substantially restricted from intruding upon the vicinity of the electronic component can be readily manufactured by the manufacture method.

In this case, the compression rate of the pliant resin member can be maintained. Therefore, the bearing stress between the pliant resin member and the casing in the vicinity of the part of the pliant resin member which contacts the molding die can be maintained to have a disable value (that is, value by which a satisfactory sealing performance can be provided).

BRIEF DESCRIPTION OF THE DRAWINGS

Other objects, features and advantages of the present invention will become more apparent from the following detailed description made with reference to the accompanying drawings, in which.

DETAILED DESCRIPTION OF THE EXAMPLED EMBODIMENT

Example Embodiment

An electrical device according to an exampled embodiment of the present invention will be described with reference to FIGS. 1-5. For example, the electrical device can be suitably used as a body 10 of a fuel level gauge 100 which is arranged in a fuel tank of a vehicle to detect a liquid surface Fa of a fuel F in the fuel tank.

Figure 1:
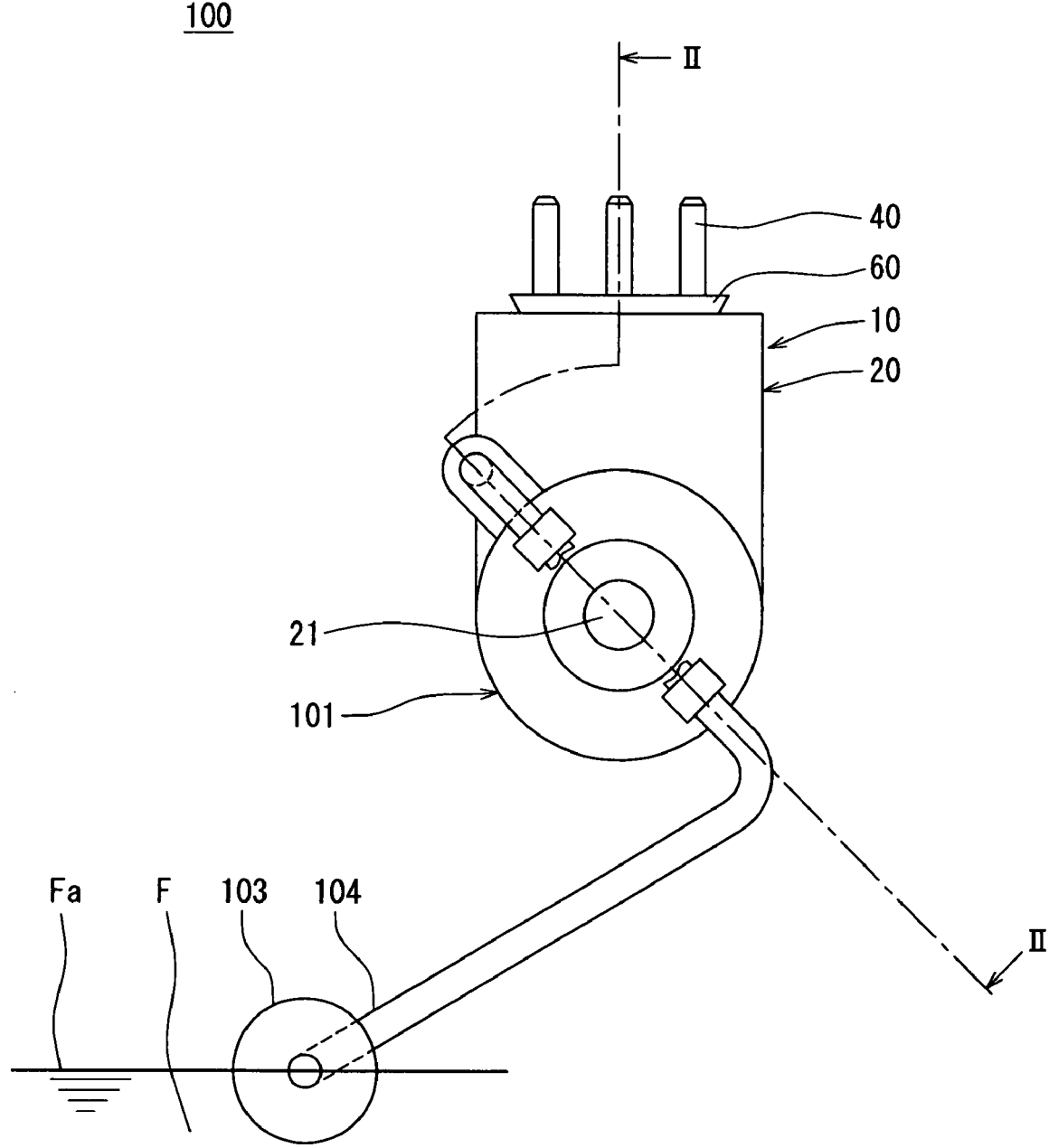
FIG. 1 is a schematic front view showing a fuel level gauge having a body as an electrical device according to an exampled embodiment of the present disclosure.

In FIG. 1 which shows the fuel level gauge 100 provided with the body 10 (electrical device), the state that the liquid surface Fa of the fuel F is at a substantially lowermost position is indicated. The upper side in FIGS. 1 and 2 corresponds to the upper side in the use state of the fuel level gauge 100.

Figure 2:
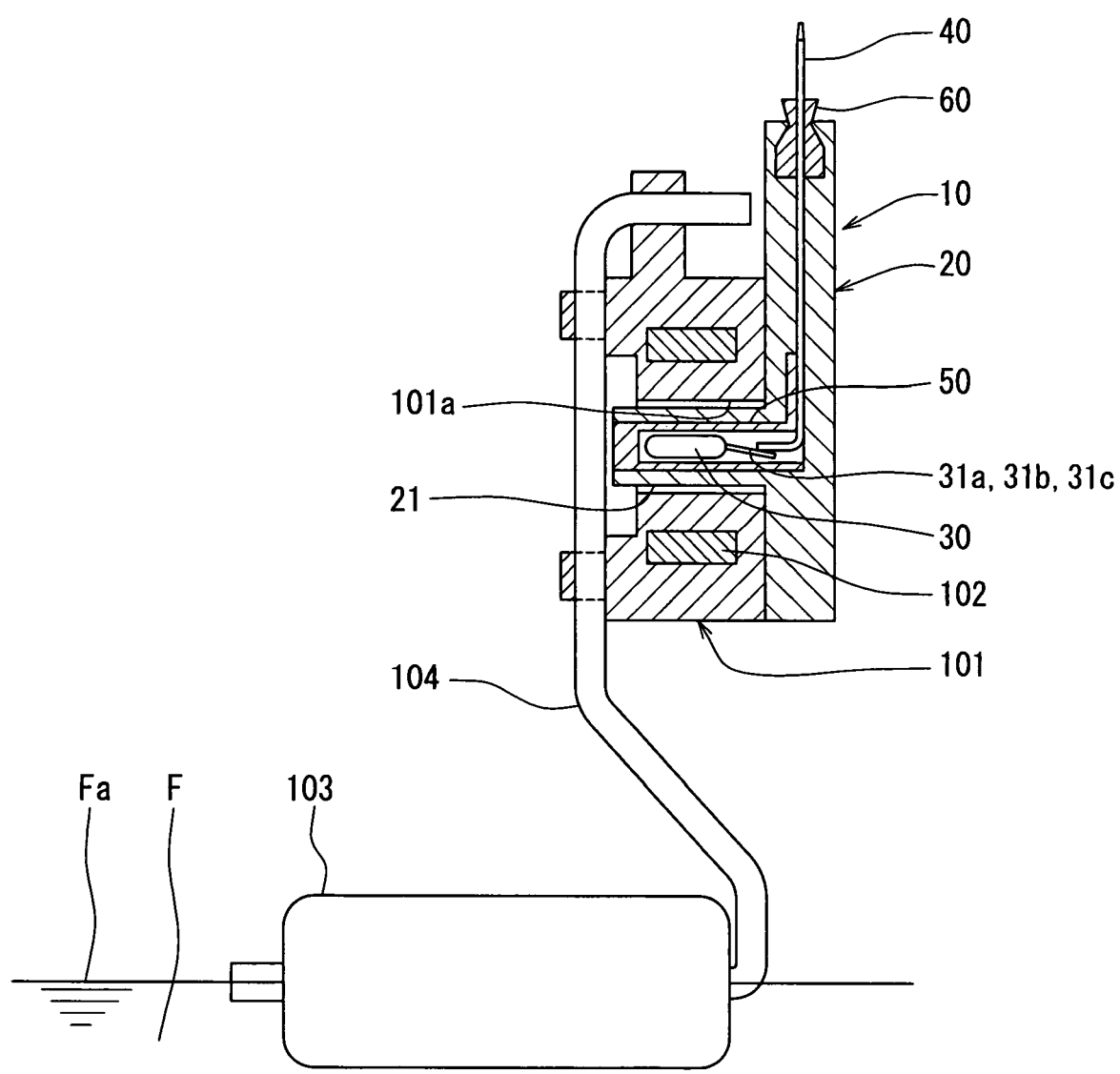
FIG. 2 is a partially sectional view taken long a line II-II in FIG. 1.

As shown in FIGS. 1 and 2, the fuel level gauge 100 is provided with the float 103, the arm 104 and a holder 101 for holding a magnet 102. The float 103 is fixed at one end of the arm 104. The other end of the arm 104 is fixed to the holder 101. The holder 101 is rotatably held at the body 10. The float 103 constantly floats at the liquid surface Fa of the fuel F and moves along with the liquid surface Fa.

The movement of the float 103, that is, an up-down-direction movement of the liquid surface Fa, is converted into a rotation movement of the holder 101 through the arm 104. The magnet 102 can be embedded in the holder 101. Moreover, a Hall element 30 as an electronic component is embedded in the body 10, in such a manner that the Hall element 30 intersects magnetic flux of the magnet 102.

The Hall element 30 converts the variation in a density of the magnetic flux which the Hall element 30 intersects into an electrical signal level, so that an output signal level from the Hall element 30 in the body 10 will vary when the holder 101 interlocks with the variation in the position of the fuel surface Fa of the fuel F to rotate. That is, the fuel level gauge 100 can detect the position of the fuel surface Fa as the electrical signal from the Hall element 30.

The holder 101 can be made of a resin material, and have a substantial ring shape, for example. As shown in FIG. 2, the holder 101 has a hole portion 101a which is rotabely engaged with a shaft portion 21 of the body 10.

Figure 5:
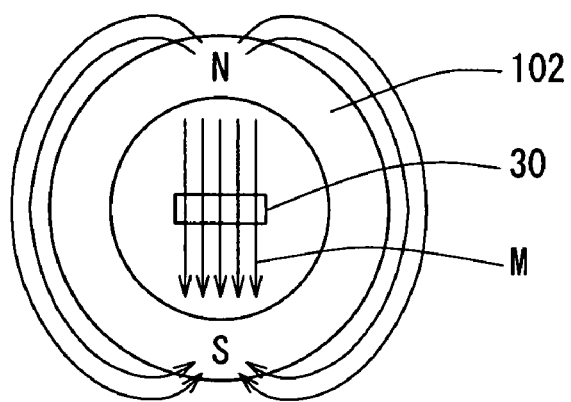
FIG. 5 is a schematic view showing a magnetic flux distribution of a magnet according to the exampled embodiment.

According to this embodiment, the magnet 102 can be constructed of a ferrite magnet or the like, and have a cylinder shape, for example. As shown in FIG. 2, the magnet 102 is arranged concentrically with the hole portion 101a. The magnet 102 is two-electrode magnetized, to substantially have the magnetic flux M as shown in FIG. 5. The magnetic flux M (of magnet 102) at the inner side of the cylinder-shaped magnet 102 flows in the diameter direction of the hole portion 101a of the holder 101.

Moreover, when the holder 101 is resin-molded, the magnet 102 is integrally molded with the holder 101 to be inserted in the holder 101. That is, the magnet 102 is insert-molded in the holder 101. In this case, the method for fixing the magnet 102 to the holder 101 is not limited to the insert-molding. For example, the magnet 102 can be fixed to the magnet holder 101 by a mechanical connection, such as a snap-fit fasteners or the like.

The arm 104 can be construed of a rod (e.g., round rod) made of a metal such as a stainless steel, for example. As shown in FIG. 1, the float 103 is fixed at the one end of the arm 104. The other end of the arm 104 is fixed to the holder 101.

The float 103 can be made of a resin material and provided with a stereoscopic shape. The apparent gravity of the float 103 is set, in such a manner that the float 103 can substantially float at the liquid surface Fa of the fuel F in the state where the float 103 has been attached to the arm 104.

When the float 103 moves in the up-down direction in accordance with the variation in the position of the liquid surface FA, the movement of the float 103 will be transmitted to the holder 101 through the arm 104 so that the holder 101 rotates with respect to the body 10.

The body 10 (electrical device) has a casing 20 in which the Hall element 30 and a terminal 40 and the like are housed. The casing 20 can be made of a resin material, for example. As shown in FIG. 2, the body 10 has the shaft portion 21 which protrudes from the casing 20 and has a substantial cylinder shape. The shaft portion 21 is engaged with the hole portion 101a of the holder 101.

In this case, after the holder 101 is mounted to the shaft portion 21, a unit (not shown) is provided to restrict the holder 101 from leaving from the shaft portion 21. For example, this unit can be constructed of a snap rink (not shown) and a groove (not shown) arranged at an end of the shaft portion 21. The snap ring can be engaged with the groove after the holder 101 is mounted to the shaft portion 21. The holder 101 contacts with the snap ring so that the movement (toward left side in FIG. 2) for the holder 101 to leave from the body 10 can be restricted.

As shown in FIG. 2, the Hall element 30 as the electronic component is housed in the shaft portion 21. Specifically, the Hall element 30 is housed in a holder 50 (sheath member) which is accommodated in the shaft portion 32 arranged at the casing 20. The holder 50 can be manufactured by molding by a resin material. In this case, the holder 50 is insert-molded with the terminal 40 being inserted, so that the holder 50 and the terminal 40 are beforehand integrated with each other.

The Hall element 30 can be constructed of a semiconductor material. The Hall element 30 generates a Hall voltage which is proportional to the density of the magnetic flux which passes the Hall element 30, when a magnetic field is applied from the exterior in the state where a voltage is applied to the Hall element 30, that is, when the magnetic flux M intersects the Hall element 30.

That is, when the magnetic flux M is orthogonal to the Hall element 30, the magnetic flux density passing the Hall element 30 becomes maximum and the Hall voltage becomes highest. When the magnetic flux M is parallel to the Hall element 30, the magnetic flux density passing the Hall element 30 will become minimum and the Hall voltage will become lowest.

In the fuel level gauge 100 according to this embodiment, when the holder 101 rotates due to the position variation of the liquid surface Fa, the magnet 102 will rotate with respect to the Hall element 30. Thus, the intersection angle between the Hall element 30 and the magnetic flux M due to the magnet 102 varies, so that the Hall voltage which is the output voltage of the Hall element 30 varies. The rotation angle of the holder 101, that is, the position of the liquid surface Fa, (i.e., position of the float 103) can be detected by detection of the Hall voltage.

The Hall element 30 which is embedded in the body 10 is provided with multiple leads (e.g., three leads 31a, 31b and 31c). According to this embodiment, the positive lead 31a can be connected with a positive pole of a power source. The negative lead 31b can be connected with a negative pole of the power source. The Hall voltage can be outputted to the exterior through the output lead 31c.

As shown in FIG. 1, corresponding to the positive lead 31a, the negative lead 31b and the output lead 31c, the body 10 can be provided with the three terminals 40, for example.

The terminal 40 can be constructed of an electrically conductive material (e.g., metal having satisfactory conductivity). The terminal can be manufactured by pressing or the like, for example. As shown in FIG. 2, first ends (of longitudinal direction) of the terminals 40 are respectively electrically connected with the leads 31a, 31b, 31c of the Hall element 30, and second ends (of longitudinal direction) of the terminals 40 extend to the outer side of the casing 20.

A seal member 60 (pliant resin member) which can be constructed of a pliant resin material such as a rubber is fixedly engaged with a part (of longitudinal direction, that is, up-down direction in FIG. 2) of the terminal 40, in such a manner that the seal member 60 covers the whole circumference of the part of the terminal 40, as shown in FIG. 2. In this case, the seal member 60 can be arranged to tightly contact the terminal 40.

The seal member 60 can be constructed of the rubber which has a satisfactory resistance to the fuel F which is the liquid surface detecting object of the fuel level gauge 100. The seal member 60 collectively covers the three terminals 40. In this case, the seal member 60 and the three terminals 40 which are contiguous to each other construct an integral member. The seal member 60 can be fixed to the terminals 40 by baking, for example. That is, the terminals 40 are insert-molded in a molding die of the seal member 60, so that the seal member 60 is integrated with the terminals 40.

As shown in FIG. 2, one part of the seal member 60 is arranged in the casing 20 and the other part thereof is exposed to the outer side of the casing 20. Furthermore, the seal member 60 is compressed in a direction (e.g., left-right direction in FIG. 2) which is orthogonal to the longitudinal direction of the terminal 40, in the vicinity of an end surface (e.g., upper end surface) of the casing 20. That is, the height from the surface of the terminal 40 to the outer surface of the seal member 60 becomes smaller at the position which is closer to this end surface of the casing 20. In this case, the one part of the seal member 60 and the other part thereof are respectively positioned at two opposite sides of the end surface of the casing 20.

Next, the manufacture method of the body 10 (electrical device) will be described.

At first, an adhering process is performed to fix the seal member 60 to the terminal 40 in such a manner that the seal member 60 tightly contacts the terminal 40. That is, the terminal 40 is set in the molding die of the seal member 60, to be insert-molded. Thus, the seal member 60 tightly contacts the surface of the terminal 40, so that the terminal 40 and the seal member 60 are integrated with each other.

Next, a first molding process is performed, to mold the holder 50 by the resin material and simultaneously fix the holder 50 to the terminal 40.

In this case, the three terminals 40 are molded to be partially connected with each other through a bridge portion by pressing or the like, to construct a single component. The bridge portion can be removed by pressing or the like after the adhering process or after the first molding process. Thus, the workability of the adhering process and the first molding process can be improved.

Then, a connecting process is performed. In this connecting process, the Hall element 30 is housed in the holder 50, and the leads 31a-31c of the Hall element 30 are respectively electrically connected with the terminals 40 corresponding thereto. Moreover, a subassembly S where the Hall element 30, the terminals 40, the holder 50 and the seal member 60 are integrated with each other is constructed. The leads 31a, 31b and 31c of the Hall element 30 can be electrically connected with the terminals 40, by welding, for example.

Thereafter, a second molding process is performed to mold the casing 20. In the second molding process, the subassembly S having been manufactured in the connecting process is set in a molding die in the casing 20 to be insert-molded.

Next, the second molding process will be described.

Figure 3:
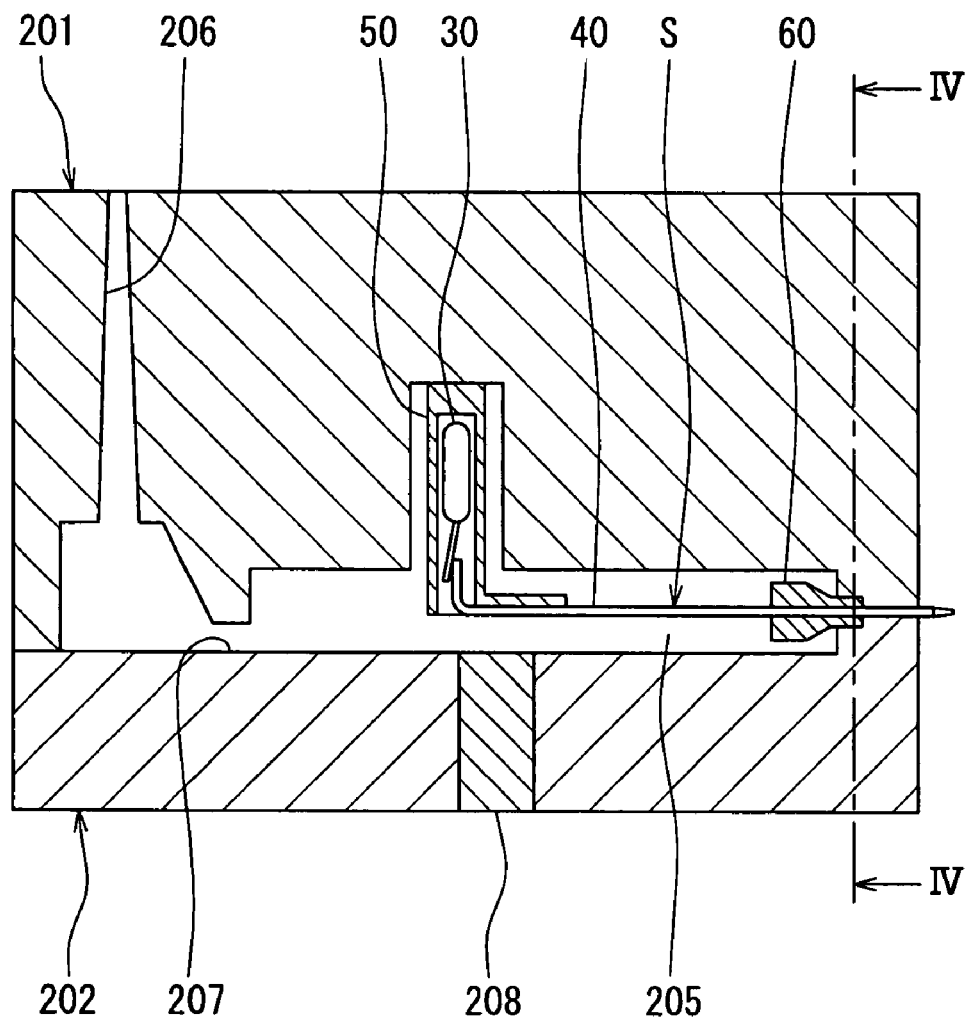
FIG. 3 is a partially sectional view showing a construction of a die used for a manufacture of a casing of the body according to the exampled embodiment.

FIG. 3 is a schematic sectional view showing a molding die 200 used in the manufacture of the casing 20 in the second molding process. In FIG. 3, the state where the swaging of the molding die 200 has been finished, that is, the state immediately before the resin is filled is shown. In this case, the state of the casing 20 shown in FIG. 3 and that shown FIG. 2 has such a position relation that the casing 20 shown in FIG. 2 is clockwise rotated by about 90 degree to reach the posture thereof shown in FIG. 3.

Figure 4:
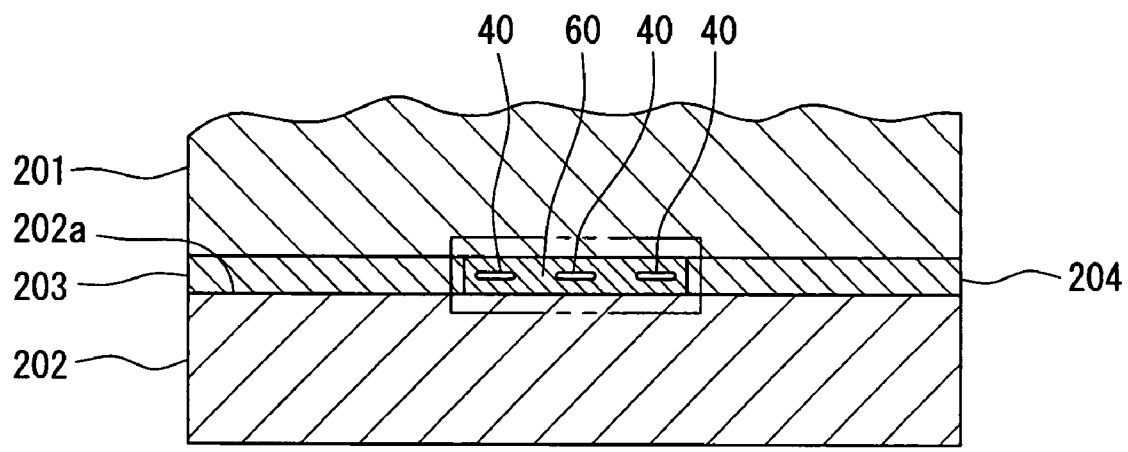
FIG. 4 is a schematic sectional view taken long a line IV-IV in FIG. 3.

With reference to FIGS. 3 and 4, the molding die 200 is provided with an upper die 201, a lower die 202 and slide cores 203 and 204 (dies 203 and 204). In the swaging of the molding die 200, the slide core 203 and the slide core 204 move along the surface 202a of the lower die 202 in the left-right direction in FIG. 4, due to the function of an inclined pin (not shown) of the molding die 200.

Specifically, the slide core 203 moves from the left side in FIG. 4 to the right side therein and the slide core 204 moves from the right side in FIG. 4 to the left side therein, to stop at the position shown in FIG. 4. The slide cores 203 and 204 along with the upper die 201 and the lower die 202 construct a cavity 205 (i.e., product portion for constructing the casing 20).

A sprue 206 as a supply passage through which the resin filled into the cavity 205 is supplied is arranged at the upper die 201. A knockout pin 208 for mold-releasing the casing 20 (which is a resin-molded product) from the lower die 202 is mounted to the lower die 202.

Next, the manufacture method of the casing 20 by using the molding die 200 will be described.

At first, the subassembly S (constructed of Hall element 30, terminal 40, holder 50 and seal member 60 which are integrated) as the insert component which is insert-molded in the casing 20 is arranged in the cavity 205, before the molding die 200 is swaged, that is, in the state where the upper die 201 and the lower die 202 are separate from each other in the up-down direction in FIG. 3 and the slide core 203 and the slide core 204 are respectively moved to the left side and the right side in FIG. 4 with contacting the lower die 202.

Next, the swaging of the molding die 200 is performed. That is, the lower die 202 and the slide cores 203 and 204 are slid toward the upper side in FIG. 3 to tightly contact the upper die 201. In this case, the slide core 203 is moved from the left side to the right side in FIG. 4 and the slide core 204 is moved from the right side to the left side in FIG. 4, to stop at the position shown in FIG. 4.

Thus, a holding process for holding the subassembly S in the cavity 205 is finished.

In this state, the seal member 60 is compressed in the up-down direction of FIG. 4 by the upper die 201 and the lower die 202, and simultaneously compressed in the left-right direction in FIG. 4 by the slide core 203 and the slide core 204.

That is, when the holding process is finished, the seal member 60 is compressed in the whole circumference thereof from a shape of a natural state indicated by a chain double dashed line to a shape indicated by a solid line in FIG. 4. In this case, the compression rate of the seal member 60 has a substantially largest value at the part of the seal member 60 which contacts the dies 201-204. The compression rate of the seal member 60 gradually becomes smaller with being positioned further from the dies 201-204, at the part of the seal member 60 which does not contact the dies 201-204 (that is, part of seal member 60 which is arranged in cavity 205).

As shown in FIG. 3, after the subassembly S is held in the cavity 205 of the molding die 200, a nozzle portion of an ejection unit (not shown) is contacted with an upper end of the sprue 206 of the upper die 201, and the liquid resin which is melted is ejected to be filled into the cavity 205 from a gate 207. The ejection of the resin will cease when the resin distributes in the whole of the cavity 205 and the sprue 206 is filled with the resin. Thus, a filling process is finished.

The resin filled in the cavity 205 is heat-absorbed by the molding die 200 so that the resin is gradually cooled from the part of the resin which contacts the inner surface of the cavity 205 to be solidified. Thus, the resin is cooled and solidified so that the casing 20 is formed. Thus, a solidification process is finished.

Next, the lower die 202 and the slide cores 203 and 204 are moved toward the lower side in FIG. 3 to be separated from the upper die 201. Moreover, the slide core 203 is moved toward the left side in FIG. 4, and the slide core 204 is moved to the right side in FIG. 4.

Then, the knockout 208 is moved toward the upper side in FIG. 3, so that the casing 20 is mold-released from the lower die 202.

Thus, as described above, the manufacture of the casing 20 of the body 10 is finished.

In this case, after the mold-releasing process is finished, the dies 201-204 are separated from the seal member 60, to be released from a force applied to the seal member 60 at the contact surface between the dies 201-204 and the seal member 60, that is, a force in the compression direction.

However, the shape (in the compression state at the time when holding process is finished) of the part of the seal member 60 which is positioned in the cavity 205 is maintained by the solidified resin material, that is, the casing 20. Therefore, at this part, the bearing stress at the contact surface between the seal member 60 and the casing 20 becomes high due to the elastic force of the seal member 60. Moreover, the bearing stress at the contact surface between the seal member 60 and the terminal 40 also becomes high.

According this embodiment, because the seal member 60 is compressed in the whole circumference direction thereof by the dies 201-204 in the manufacture process of the casing 20 (specifically, in holding process for holding subassembly S in molding die 200), the compression state of the seal member 60 (when manufacture of body 10 has been completed) is maintained by the casing 20.

Thus, in the use of the fuel level gauge 100, when the body 10 is dipped in the fuel F, the fuel F can be substantially hampered from entering the casing 20 from the part between the seal member 60 and the casing 20 and the part between the seal member 60 and the terminal 40.

Moreover, according to this embodiment, the Hall element 30 is insert-molded when the casing 20 is molded, in such a manner that the Hall element 30 is beforehand housed in the holder 50.

According to the above-described construction, when the casing 20 is molded, the deterioration of the Hall element 30 due to being heated can be restricted because the Hall element 30 does not directly contact the melted resin which is injected. Furthermore, the posture of the Hall element 30 can be restricted from varying due to the pressure of the melted resin which is injected. Thus, the posture and the position of the Hall element 30 in the casing 20 can be maintained with a high accuracy.

In this embodiment, the Hall element 30 which is the magnetoelectric conversion element for converting the variation of the magnetic flux into the electrical signal is exampled as the electronic component. However, other kind of magnetoelectric conversion element, for example, a MRE element (magnetic resistance element) or a magnetic diode or the like can be also used.

Moreover, in this embodiment, the body 10 is provided with the holder 50 which is inert-molded in the casing 20, in the state where the Hall element 30 is held in the holder 50. However, the holder 50 can be also omitted, according to conditions such as a heat-resistant temperature of the electronic component which is used, a melt temperature of the molding resin of the casing 20 and the like.

In this embodiment, the case where the electrical device according to the present invention is suitably used as the body 10 of the fuel level gauge 100 is exampled. However, the present invention can be also suitably used for an electrical device of other kind. Specially, in the case where the present invention is suitably used as an electrical device used in a state where the electrical device is dipped in a liquid, the similar effects to the case of the body 10 can be obtained. That is, the liquid can be restricted from entering the casing from the protrusion portion of the terminal of the casing.

What is claimed is:

1. An electrical device, comprising:
    an electronic component;
    a terminal which is electrically conductive and connected with the electronic component;
    a pliant resin member which contacts a part of the terminal in a longitudinal direction of the terminal and covers a whole circumference of the part; and
    a casing for holding the electronic component, the terminal and the pliant resin member, wherein:
    the casing is molded by a resin material with the electronic component, the terminal and the pliant resin member being insert-molded;
    an end portion of the terminal is positioned at an outer side of the casing, the end portion being at an opposite side of the terminal to the electronic component;
    one part of the pliant resin member is covered by the casing and an other part of the pliant resin member is exposed to the outer side of the casing; and
    the pliant resin member is compressed in a direction which is substantially orthogonal to the longitudinal direction of the terminal, in the vicinity of an end surface of the casing.

2. The electrical device according to claim 1, wherein the pliant resin member is constructed of a rubber.

3. An electrical device, comprising:
    an electronic component;
    a terminal which is electrically conductive and connected with the electronic component;
    a sheath member which is molded by a first resin material and fixed to a part of the terminal due to molding to house therein the electronic component;
    a pliant resin member which contacts a part of the terminal in a longitudinal direction of the terminal and covers a whole circumference of the part; and
    a casing for holding the sheath member in which the electronic component is housed, the terminal and the pliant resin member, wherein:

the casing is molded by a second resin material with the terminal, the pliant resin member and the sheath member housing therein the electronic component being insert-molded;

an end portion of the terminal is positioned at an outer side of the casing, the end portion being at an opposite side of the terminal to the electronic component;

one part of the pliant resin member is covered by the casing and an other part of the pliant resin member is exposed to the outer side of the casing; and the pliant resin member is compressed in a direction which is substantially orthogonal to the longitudinal direction of the terminal, in the vicinity of an end surface of the casing.

4. The electrical device according to claim 3, wherein the pliant resin member is constructed of a rubber.

5. A manufacture method for the electrical device according to claim 1, comprising:

an adhering process for fixedly contacting the pliant resin member with the terminal by molding;

a connecting process for electrically connecting the electronic component with the terminal to construct a subassembly, the connecting process being performed after the adhering process; and a molding process for molding the casing after the connecting process, wherein the molding process including a holding process, a filling process, a solidifying process, and a mold-releasing process, the holding process being performed to hold the subassembly in a cavity of a molding die for the casing while the pliant resin member is pressed and compressed by the molding die, the filling process being performed to fill the resin material of the casing into the cavity after the holding process, the solidifying process being performed to solidify the resin material in the cavity, the mold-releasing process being performed to take the casing have been molded out of the molding die after the solidifying process.

6. A manufacture method for the electrical device according to claim 2, comprising:

an adhering process for fixedly contacting the pliant resin member with the terminal by molding;

a connecting process for electrically connecting the electronic component with the terminal to construct a subassembly, the connecting process being performed after the adhering process; and a molding process for molding the casing after the connecting process, wherein the molding process including a holding process, a filling process, a solidifying process, and a mold-releasing process, the holding process being performed to hold the subassembly in a cavity of a molding die for the casing while the pliant resin member is pressed and compressed by the molding die, the filling process being performed to fill the resin material of the casing into the cavity after the holding process, the solidifying process being performed to solidify the resin material in the cavity, the mold-releasing process being performed to take the casing have been molded out of the molding die after the solidifying process.

7. A manufacture method for the electrical device according to claim 3, comprising:

an adhering process for fixedly contacting the pliant resin member with the terminal by molding;

a first molding process for molding the sheath member by the first resin material and simultaneously fixing the sheath member to the part of the terminal;

a connecting process for accommodating the electronic component in the sheath member and electrically connecting the electronic component with the terminal to construct a subassembly, the connecting process being performed after the first molding process; and a second molding process for molding the casing after the connecting process, wherein the second molding process includes a holding process, a filling process, a solidifying process, and a mold-releasing process, the holding process being performed to hold the subassembly in a cavity of a molding die for the casing while the pliant resin member is pressed and compressed by the molding die, the filling process being performed to fill the second resin material into the cavity after the holding process, the solidifying process being performed to solidify the second resin material in the cavity, the mold-releasing process being performed to take the casing have been molded out of the molding die after the solidifying process.

8. A manufacture method for the electrical device according to claim 4, comprising:

an adhering process for fixedly contacting the pliant resin member with the terminal by molding;

a first molding process for molding the sheath member by the first resin material and simultaneously fixing the sheath member to the part of the terminal;

a connecting process for accommodating the electronic component in the sheath member and electrically connecting the electronic component with the terminal to construct a subassembly, the connecting process being performed after the first molding process; and a second molding process for molding the casing after the connecting process, wherein the second molding process includes a holding process, a filling process, a solidifying process, and a mold-releasing process, the holding process being performed to hold the subassembly in a cavity of a molding die for the casing while the pliant resin member is pressed and compressed by the molding die, the filling process being performed to fill the second resin material into the cavity after the holding process, the solidifying process being performed to solidify the second resin material in the cavity, the mold-releasing process being performed to take the casing have been molded out of the molding die after the solidifying process.

9. The electrical device according to claim 1, wherein the one part of the pliant resin member which is covered by the casing and the other part of the pliant resin member which is exposed to the outer side of the casing are respectively positioned at two opposite sides of the end surface of the casing.

10. The electrical device according to claim 1, wherein, due to the pliant resin member being compressed in said orthogonal direction, a width of the pliant resin member in the vicinity of the end surface of the casing is reduced relative to a remainder of the pliant resin member.

11. The electrical device according to claim 1, wherein the pliant resin member is compressed to a greater extent in said orthogonal direction in the vicinity of the end surface of the casing than it is compressed in any direction on a remainder of the pliant resin member.

12. The electrical device according to claim 9, wherein a width of said pliant resin member is smaller at the end surface of the casing, due to said compression, than a width of either the one part which is covered by the casing or the other part which is fully exposed to the outer side.

13. The manufacture method according to claim 5, wherein the pliant resin member is pressed and compressed by the molding die in said direction substantially orthogonal to the longitudinal direction of the terminal, and the molding die compresses the pliant resin member so that a width of the portion of the pliant resin member engaged by the molding die is reduced relative to a remainder of said pliant resin member.

14. The manufacture method according to claim 5, wherein, due to the pliant resin member being pressed and compressed by said molding die, upon conclusion of said solidifying process, a width of the pliant resin member in the vicinity of the end surface of the casing is reduced relative to a remainder of the pliant resin member.

15. The manufacture method according to claim 6, wherein the pliant resin member is pressed and compressed by the molding die in said direction substantially orthogonal to the longitudinal direction of the terminal, and the molding die compresses the pliant resin member so that a width of the portion of the pliant resin member engaged by the molding die is reduced relative to a remainder of said pliant resin member.

* * * * *